(12) United States Patent
Kolman et al.

(10) Patent No.: US 12,525,844 B2
(45) Date of Patent: Jan. 13, 2026

(54) ELECTRIC POWER SUPPLY DEVICE FOR AN ELECTRIC MOTOR

(71) Applicant: MAHLE International GmbH, Stuttgart (DE)

(72) Inventors: Tadej Kolman, Miren (SI); Florian Schuetrumpf, Sempeter pri Gorici (SI)

(73) Assignee: Mahle International GmbH

( * ) Notice: Subject to any disclaimer, the term of this patent is extended or adjusted under 35 U.S.C. 154(b) by 269 days.

(21) Appl. No.: 18/123,255

(22) Filed: Mar. 17, 2023

(65) Prior Publication Data

US 2023/0299635 A1    Sep. 21, 2023

(51) Int. Cl.
| | | |
|---|---|---|
| *H02K 5/22* | (2006.01) | |
| *H02K 3/52* | (2006.01) | |
| *B60H 1/00* | (2006.01) | |
| *B60R 16/02* | (2006.01) | |

(52) U.S. Cl.
CPC ............ *H02K 5/225* (2013.01); *H02K 3/522* (2013.01); *B60H 1/00* (2013.01); *B60R 16/0207* (2013.01); *H02K 2203/09* (2013.01)

(58) Field of Classification Search
CPC ............ H02K 3/00; H02K 3/28; H02K 3/284; H02K 3/50; H02K 3/52; H02K 3/522; H02K 5/00; H02K 5/02; H02K 5/04; H02K 5/08; H02K 5/10; H02K 5/17; H02K 5/16; H02K 5/1612; H02K 5/203; H02K 5/22; H02K 5/225; H02K 11/00; H02K 11/21; H02K 11/215; H02K 11/22; H02K 11/225; H02K 11/33; H02K 2203/09; B60H 1/00; B60R 16/0207
See application file for complete search history.

(56) References Cited

U.S. PATENT DOCUMENTS

| | | | | |
|---|---|---|---|---|
| 10,411,545 | B2 * | 9/2019 | Haga ...................... | H02K 3/522 |
| 11,289,969 | B2 * | 3/2022 | Makino .................. | H02K 3/522 |
| 2011/0006625 | A1 | 1/2011 | Fujii | |
| 2014/0239755 | A1 * | 8/2014 | Nagao .................... | H02K 5/203 |
| | | | | 310/68 D |
| 2016/0013697 | A1 * | 1/2016 | Haga ...................... | H02K 5/08 |
| | | | | 310/71 |

FOREIGN PATENT DOCUMENTS

EP    3927125 A1    12/2021

* cited by examiner

*Primary Examiner* — Tran N Nguyen
(74) *Attorney, Agent, or Firm* — Fishman Stewart PLLC

(57) ABSTRACT

An electric power supply device for an electric motor is disclosed. The device includes a housing including a pot base and a pot collar projecting at an angle from the pot base. An electrical connection unit is arranged in a housing interior that includes a busbar arrangement with at least three busbars for an electrical power supply. The connection unit includes an electrically insulating plug via which the busbars are electrically led out of the housing interior. The plug is arranged at least partially in a lead-through opening disposed on the pot collar and has a plug housing, in which the respective end portions of the busbars are arranged. The plug merges into a flange section that fixes the connection unit on the pot base.

20 Claims, 3 Drawing Sheets

ELECTRIC POWER SUPPLY DEVICE FOR AN ELECTRIC MOTOR

CROSS-REFERENCE TO RELATED APPLICATION

This application claims priority to European Application No. EP22163077.5 filed on Mar. 18, 2022, the contents of which are hereby incorporated by reference in its entirety.

TECHNICAL FIELD

The invention relates to an electric power supply device for an electric motor, in particular for a BLDC motor, and to an electric motor with such a power supply device.

BACKGROUND

Cooling air-generating blowers for electric vehicles are often driven by electric motors, in particular BLDC motors. The electrical power supply is provided by means of a wiring harness that can be connected to an electrical power source. Such a wiring harness can contain several electrical lines that are electrically welded to a connecting plate arranged in a housing of the motor.

Since considerable vibrations can typically occur during operation of the motor in the electric vehicle, there is a risk that said welded connection can become loose. In extreme cases, the welded joint can break and thus damage the power supply device of the motor.

It is therefore an object of the present invention to create an improved embodiment for a power supply device for an electric motor mentioned at the beginning, in which in particular the problem explained above is addressed. In particular, an improved power supply device is to be created in which a particularly damage-proof electrical connection of the power supply is realized externally.

This task is solved by the subject of the independent patent claim(s). Preferred embodiments are the subject of the dependent patent claims.

Accordingly, the basic idea of the present invention is to provide said electrical power supply with an integrated electrical connection unit via which electrical conduction path by means of which an electric motor equipped with the power supply device can be connected to an external electrical power supply. Following the idea of the invention, such an electrical connection unit comprises, on the one hand, a busbar arrangement with electrically conductive busbars and an, on the other hand, electrically insulating plug. The connection unit can thus be passed through a housing of the power supply device and at the same time be fixed in the housing interior limited by the housing. Thus, it is not absolutely necessary to weld said busbars or the entire connection unit to a connection plate or the like arranged in the interior of the housing, as is known from conventional power supply devices.

Rather, according to the invention, the busbars can be mechanically and electrically connected to the actual electrical connections of the electric motor equipped with the power supply measured without such a welded connection. Conversely, external electrical lines can be connected to the connector provided on the housing, via which the electrical connection of the current slides and thus of the electric motor with the external power supply can then be realized. With the solution presented here according to the invention, there is no longer the risk that said welded connections—but alternatively also soldered connections—can be damaged or destroyed due to mechanical action. In addition, the above-mentioned power supply according to the invention can be implemented relatively easily from a technical point of view, which also results in a simplified assembly of the power supply device and thus also of the motor equipped with the power supply device. Furthermore, the service life of the power supply device is not increased by significant amounts.

In detail, an electrical power supply device according to the invention comprises a housing which at least partially surrounds a housing interior. The housing has a housing opening which can preferably be closed by means of a housing cover. In addition, the housing is pot-shaped and has a pot base and a pot collar projecting at an angle, preferably at a right angle, from the pot base. An electrical connection unit of the power supply device is arranged in the housing interior, which comprises a busbar arrangement with at least three, preferably with four, electrical busbars for the electrical power supply of the motor. The busbars are configured in such a way that they can be electrically and mechanically connected to a respective electrical connection element of the electric motor arranged on the pot base for electrically energizing the same. The electrical connection unit further comprises an electrically insulating plug by means of which the busbars of the busbar arrangement are electrically led out of the interior of the housing. Electrical supply lines can be connected to the plug, which in turn can be electrically connected to an external power supply. The plug is partially disposed in a feedthrough opening formed on the pot collar. The plug includes a plug housing in which respective end portions of the bus bars are disposed. Furthermore, the plug merges into a flange section of the plug. By means of the flange section, the connector unit can be fixed or is fixed to the pot bottom of the housing.

In a preferred embodiment, the busbar assembly and the plug are fixedly connected to each other so as to form a structural unit. As a result, the electrical connection unit can also be installed in the housing of the power supply device with particular ease. This simplifies the manufacture of the power supply device, which is accompanied by cost advantages in the manufacture thereof.

According to an advantageous further development, the material of the busbars is a metal, whereas the material of the electrical connection unit is a plastic. In this further development, the electrical busbars are at least partially overmolded with the plastic of the connection unit for fixing to the connection unit. In this way, the advantageous design of the electrical connection unit explained above can be implemented particularly easily as a structural unit comprising a busbar arrangement and a housing.

Particularly expediently, the plastic can comprise or be a thermally resistant polymer.

In another preferred embodiment, the plastic can be open and delimit a plug housing interior. In the plug housing interior, the end sections of the busbars are arranged. In this way, the individual busbars can be electrically connected to an electrical power supply via electrical lines, which can in particular be combined in a cable harness or the like. Said connection can be made via a suitable electrical plug counterpart, which is inserted into the plug housing of the plug and, if necessary, can also be removed from it again by pulling it out of the plug.

Particularly preferably, the flange section and the plug housing can be formed integrally with each other. This variant is technically particularly easy to implement, which is accompanied by cost advantages in production. In addition, the integral design of the flange section and the connector housing allows simple assembly of the connection unit in the interior of the housing of the power supply unit by fastening it to the housing of the power supply unit. This is accompanied at the same time by a stable fastening of the connector by mounting the flange section in the housing interior.

According to an advantageous further development of the invention, the flange section can be fastened or secured, preferably detachably, particularly preferably by means of at least one screw connection, to the pot base. In this way, the entire electrical connection unit can be permanently fixed in a mechanically stable manner to the housing or in the housing interior. In particular, it can be prevented that the fixed stable fastening is undesirably reduced by vibrations or mechanical shocks or mechanical impacts and the like, as these may occur during operation of the electric motor, in particular when this drives a fan.

The flange section can be configured as a flange plate in which there is at least one through opening for receiving a screw element. This enables a flat and thus mechanically particularly stable fastening of the electrical connection unit to the housing.

According to a further advantageous further development, the busbars are arranged between the bottom of the pot and the flange section when the flange section is attached to the bottom of the pot or when the flange plate is attached to the bottom of the pot, preferably in a sandwich-like manner. In this way, the busbars are fastened to the housing in a way that saves space but is nevertheless mechanically stable. In addition, the flange section or the flange plate can function as a cover that prevents the electrically conductive busbars from being exposed to a worker when the housing of the power supply unit is open.

According to an advantageous further development, the plug housing is positively connected to the cup collar and closes the feed-through opening provided on the cup collar. In this way, it can be prevented that through the lead-through formed by the plug.

The invention further relates to an electric motor, in particular a BLDC motor. The advantages of the power supply device according to the invention explained above are therefore transferred to the motor according to the invention. The motor according to the invention comprises an electrical power supply device according to the invention presented above, so that the advantages of the power supply device according to the invention explained above are transferred to the motor according to the invention. This further comprises a stator and with a rotor rotatable relative to the stator. Furthermore, the motor according to the invention comprises a motor housing in which at least one stator coil, which can be electrically energized by means of the power supply device, is arranged for driving the rotor.

In a preferred embodiment, the power supply device is arranged on the outside of the motor housing. This ensures easy access to the interior of the housing of the power supply unit for a worker, for example if individual components are to be replaced—for example for repair purposes.

In a further preferred embodiment, the housing of the power supply unit rests against the motor housing and is fastened to it in particular. Such a fastening can be a non-detachable fastening or, alternatively, a detachable fastening. The former variant is mechanically particularly stable and also inexpensive to manufacture, whereas the latter variant permits more flexibility, in particular if the power supply device is to be replaced.

Further important features and advantages of the invention will be apparent from the sub-claims, from the drawings and from the accompanying figure description based on the drawings.

It is understood that the above-mentioned features and those still to be explained below can be used not only in the combination indicated in each case, but also in other combinations or on their own, without leaving the scope of the present invention.

Preferred examples of embodiments of the invention are shown in the drawings and are explained in more detail in the following description, wherein the same reference signs refer to identical or similar or functionally identical components.

BRIEF DESCRIPTION OF THE DRAWINGS

They show, schematically in each case.

DETAILED DESCRIPTION

Figure 1:
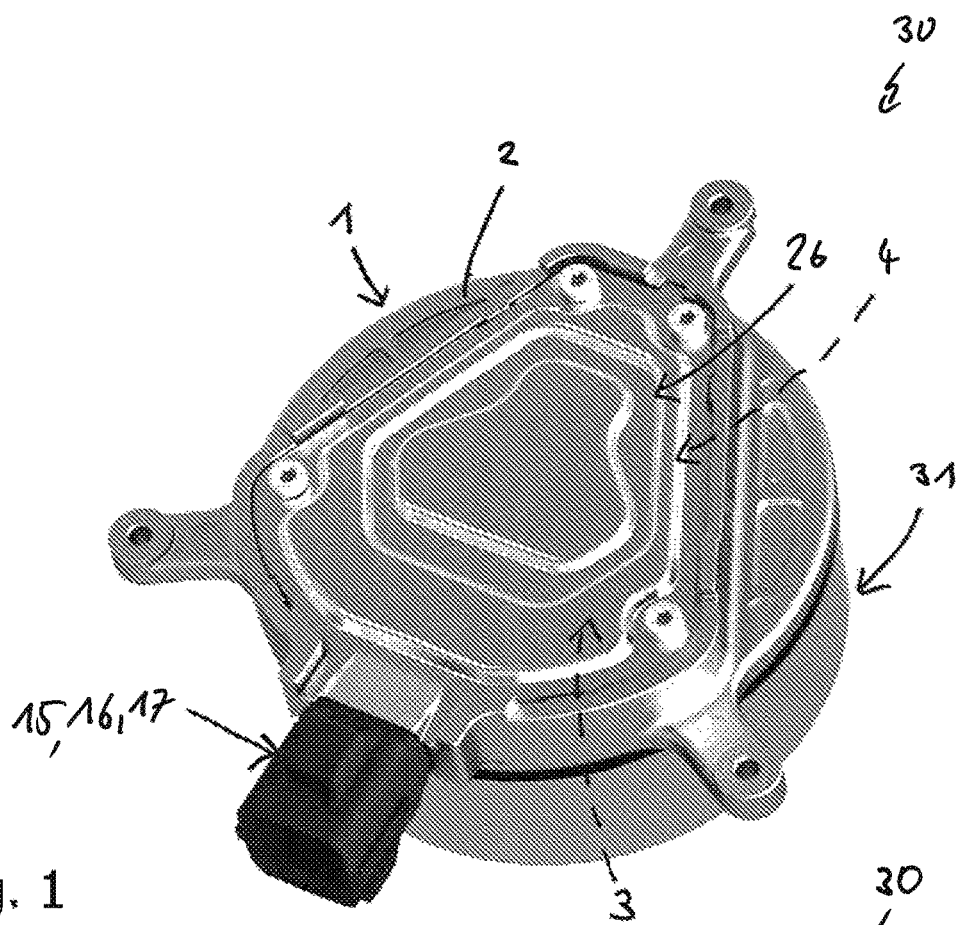
FIGS. 1 and 2 show different perspective representations of an example of an electric motor according to the invention with an electric power supply device according to the invention attached to the motor housing, FIG. 3 the motor of FIGS. 1 and 2 with the power supply device without the housing cover, so that the interior of the housing can be seen.
Figure 2:
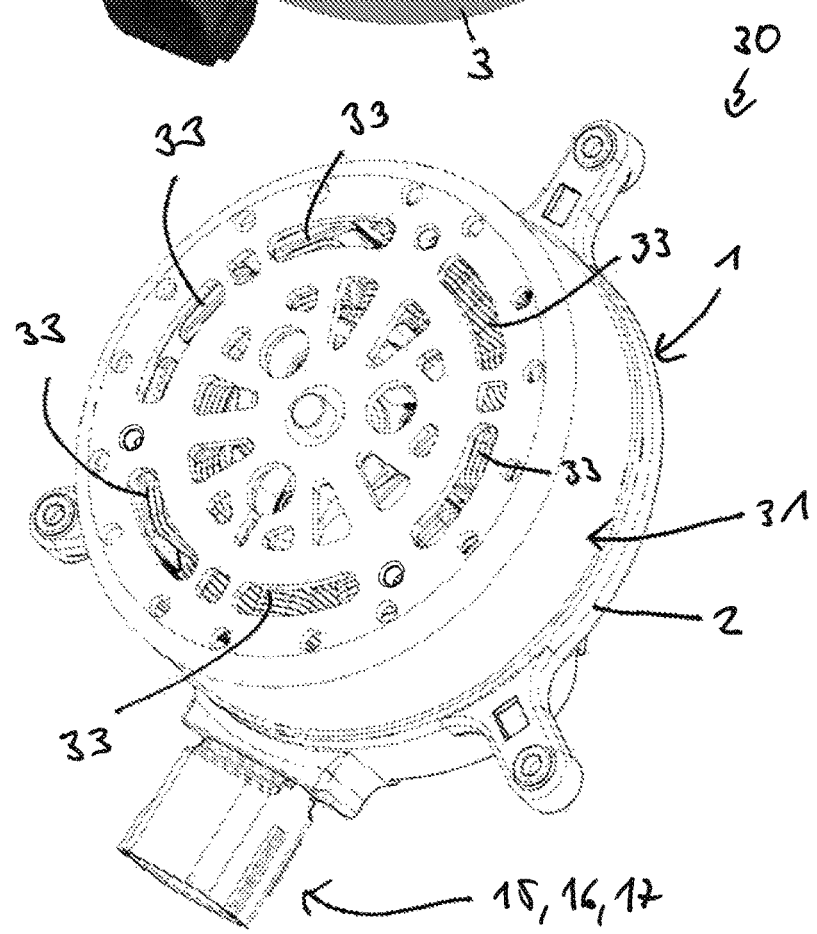

FIGS. 1 and 2 show different perspective views of an electric motor 30 according to the invention, which may be designed as a BLDC motor. The motor 30 comprises a stator and a rotor (not shown) rotatable relative to the stator. Furthermore, the motor 30 according to the invention comprises a motor housing 31 in which several electrically energizable stator coils 33 (cf. FIG. 2) are arranged for driving the rotor by means of magnetic interaction.

The motor 30 further comprises an electrical power supply device 1 according to the invention for electrically energizing the stator coils of the stator The power supply device 1 of the motor 30 is arranged on the outside of the motor housing 31 in the example scenario. The housing 2 of the power supply device 1 rests against the motor housing 31 and may be detachably or non-detachably attached thereto. The electrical power supply device 1 comprises a housing 2 which at least partially surrounds a housing interior 3. According to FIG. 2, the housing 2 has a housing opening 4 that can be closed by means of a housing cover.

Figure 3:
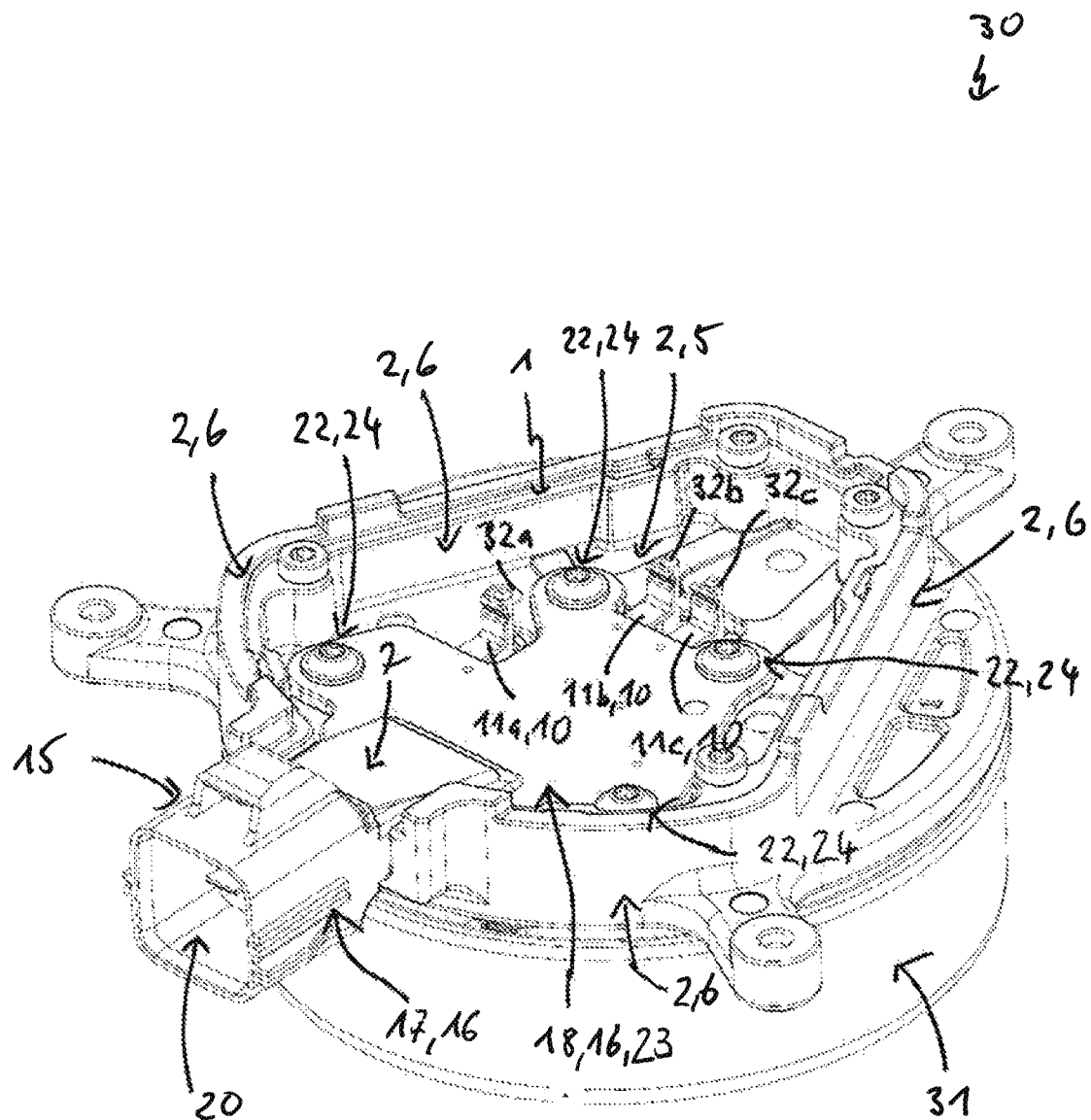

FIG. 3 shows the electric motor 30 with the power supply device 1 without the housing cover 26, so that the housing interior 3 can be seen. According to FIG. 3, the housing 2 is pot-shaped and has a pot base 5 and a pot projection 6 projecting at an angle, preferably at a right angle, from the pot base 5. An electrical connection unit 15 of the power supply device 1 is provided in the housing interior 3.

Figure 4:
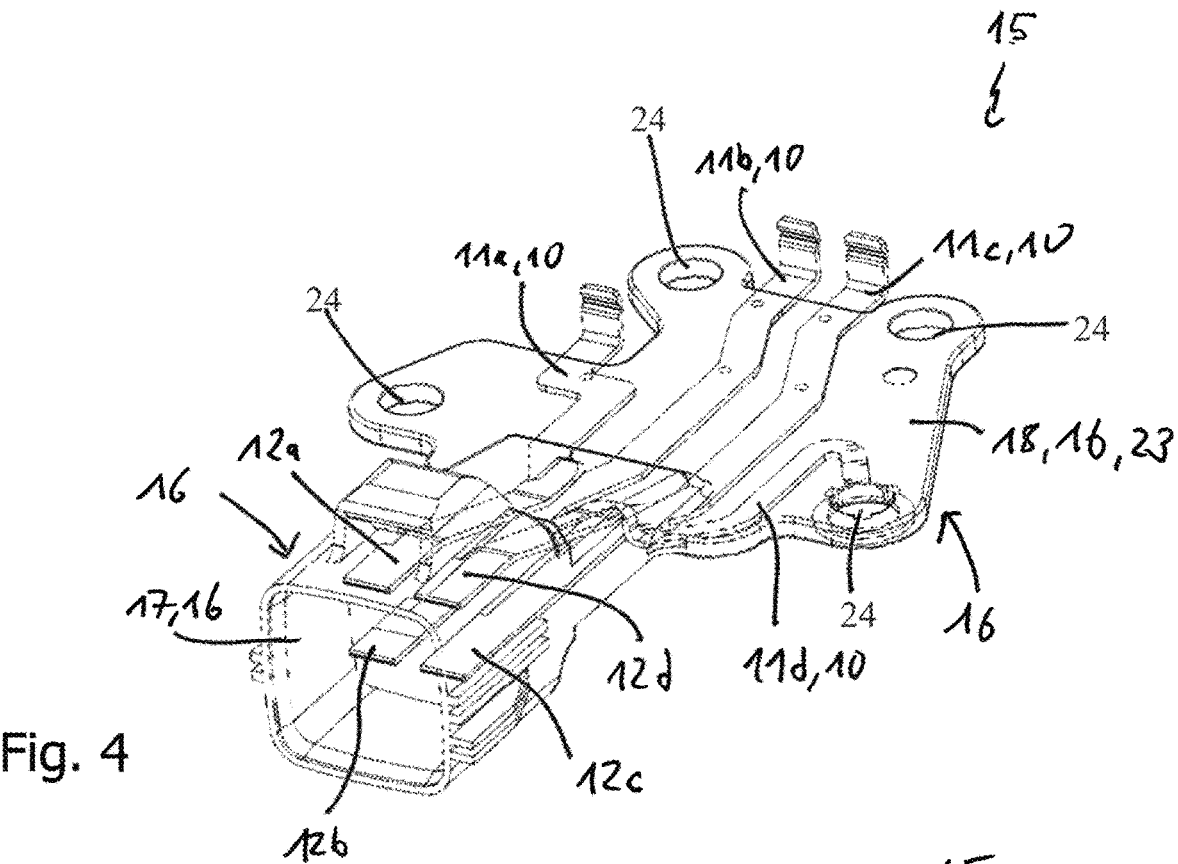
FIGS. 4 and 5 show the electrical connection unit of the power supply device in separate perspective view.
Figure 5:
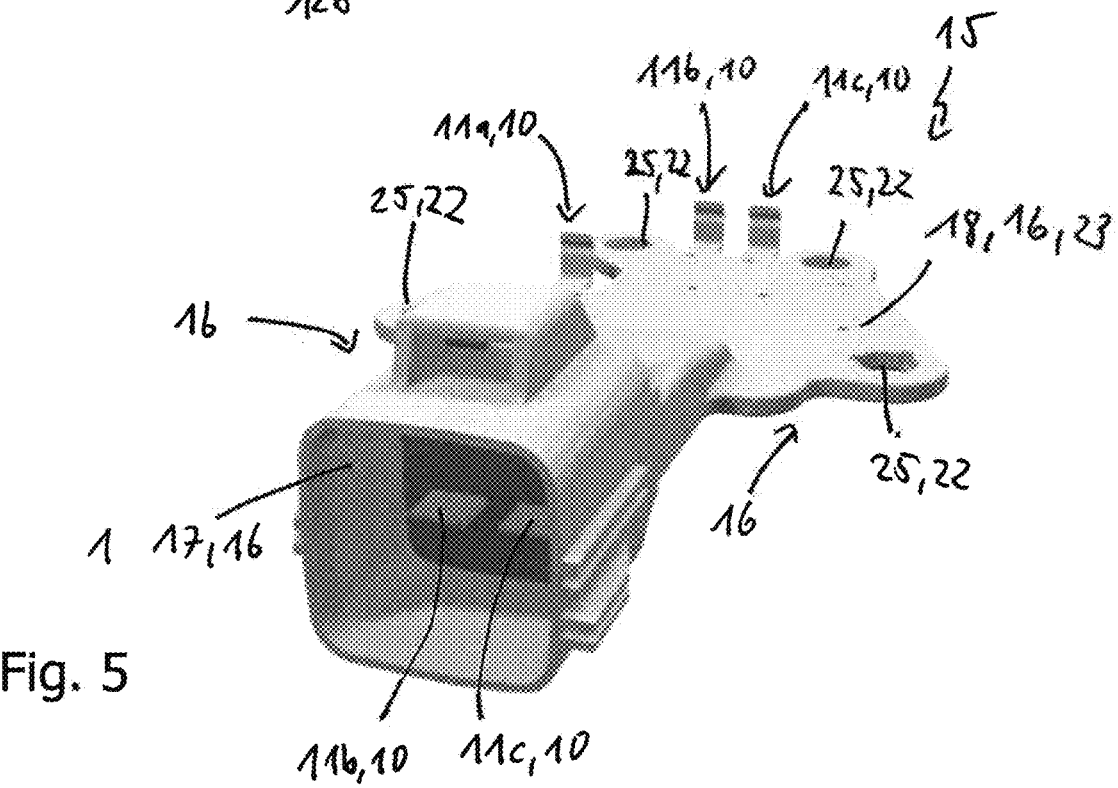

FIGS. 4 and 5 show the connection unit 15 in separate perspective view. FIG. 4 is a representation in which components of the connection unit 15 that are actually concealed in the view shown are nevertheless recognizable.

Accordingly, the electrical connection unit 15 comprises a busbar arrangement 10 with four electrical busbars 11a-11d for supplying electrical power to the motor 3 and an electrically insulating plug 16 by means of which the busbars 11a-11d of the busbar arrangement 10 can be led electrically out of the housing interior 3 (cf. FIG. 3). Via the connection unit 15 of the power supply device 1, an electrical connection of the motor 30 with an external electrical power supply (not shown) can be realized. The material of the electrical bus bars 11a-11d may be a metal, whereas the material of the electrical connection unit 15 is preferably an electrically insulating plastic. The electrical busbars 11a-11d are configured in such a way that they can be electrically and mechanically connected to a respective electrical connection element of the motor 30 arranged on the pot base 5.

This can be seen in FIG. 3 for the three busbars 11a-11c, which are in mechanical contact with a respective connection element 32a-32c arranged on the pot base 5 and are thus electrically connected to the respective connection element 32a-32c. In the example, the three connection elements 32a-32c are of pin or pin-like design and are each electrically connected to one of the three phases of the motor 30 (not shown) for electrically energizing the stator coils 33.

According to FIG. 4, the busbars 11a to 11d are arranged at a distance from each other so that the necessary mutual electrical insulation is ensured. Thus, the three busbars 11a to 11c can be used to electrically energize the three different electrical phases (not shown) of the motor 30 independently of each other. The fourth busbar 11d is used to connect the electric motor 30 to an external electrical ground.

Referring to FIGS. 4 and 5, the connector 16 includes a connector housing 17 in which respective end portions 12a-12d of the bus bars 11a-11d are disposed. By inserting external electrical connection leads having a connector counterpart (not shown) complementary to the connector 16 into the connector housing 17, the electric motor 30 can be connected to an external electrical power supply (not shown) via the power supply unit 1.

As further illustrated in FIGS. 4 and 5, the connector housing 17 mates with a flange portion 18 of the connector 16. By means of the flange section 18, the connector unit 15 can be fixed to the pot bottom 5 of the housing 2 as shown in FIG. 3. In the example scenario, the plug housing 17 is arranged in a lead-through opening 7 formed on the pot collar 7 as shown in FIG. 3. In this case, the plug housing 17 is positively connected to the pot collar 6 and closes the feed-through opening 7 provided on the pot collar 6. The plug housing 17 is of pot-like and thus open design and defines a plug housing interior space 20. The end sections 12a-12d of the electrical busbars 11a-11d are arranged in the plug housing interior space 20. In the example, the flange section 18 and the plug 16 or the plug housing 17 are integrally formed with each other.

As can be seen from FIGS. 4 and 5, the electrically conductive bus bar assembly 10 and the plug 16 are fixedly connected to each other so that the bus bar assembly 10 and the electrically insulating plug 16 form a structural unit. For fixing to the connection unit 15, the electrical busbars 11a-11d can be overmolded at least in sections with the plastic of the connection unit 15. Expediently, the plastic, i.e. the material of the connection unit 15, may be a thermally resistant polymer. The flange section 18 may, may be releasably secured to the pot base 5 by means of a plurality of screw connections 22. For this purpose, the flange section 18 can be configured as a flange plate 23, as shown in FIGS. 3, 4 and 5 respectively, in which at least one through opening 24 is provided for receiving a screw element 25 (cf. FIG. 3).

In the state of the flange section 18 or the flange plate 23 shown in FIG. 3, which is fastened to the pot base 6, the electrical busbars 11a-11d are arranged like a sandwich between the pot base 5 and the flange section 18.

The invention claimed is:

1. An electric power supply device for an electric motor, comprising:
   a housing that at least partially surrounds a housing interior and the housing has a housing opening, the housing comprising a pot-shaped structure including a pot base and a pot collar projecting at an angle from the pot base,
   an electrical connection unit arranged in the housing interior that includes a busbar arrangement with at least three electrically conductive busbars for an electrical power supply,
   wherein the electrical connection unit further includes an electrically insulating plug via which the at least three electrical busbars are electrically led out of the housing interior, the electrically insulating plug arranged at least partially in a lead-through opening, the lead-through opening defined in the pot collar, the electrically insulating plug has a plug housing, wherein respective end portions of the at least three electrical busbars are arranged in the plug housing, the electrically insulating plug merging into a flange section structured and arranged to fix the electrical connection unit on the pot base of the housing,
   wherein the at least three busbars are arranged between the pot base and the flange section when the flange section is fastened to the pot base, and
   wherein the flange section is structured as a flat flange plate that covers the at least three bus bars, thereby providing a flat and mechanically stable fastening of the electrical connection unit to the pot base.

2. The electric power supply device according to claim 1, wherein the busbar arrangement and the electrically insulating plug are fixedly connected to one another so that they form a structural unit.

3. The electric power supply device according to claim 1, wherein the plug housing is open and defines a plug housing interior in which the respective end sections of the at least three busbars are arranged.

4. The electric power supply device according to claim 1, wherein the flange section and the plug housing are integrally formed on each other.

5. The electric power supply device according to claim 1, wherein the flange section is fastened to a bottom of the pot base.

6. The electric power supply device according to claim 1, wherein the flange plate is provided with at least one through-opening for receiving a screw element.

7. The electric power supply device according to claim 1, wherein the at least three busbars are arranged sandwiched between opposing sides of the pot base and the flange plate when the flange section is fastened to the pot base.

8. The electric power supply device according to claim 1, wherein the plug housing is positively connected to the pot collar and closes the lead-through opening provided on the pot collar.

9. The electric power supply device according to claim 1, wherein:
   a material of the at least three busbars is a metal,
   a material of the electrical connection unit is a plastic, and
   the at least three busbars are at least partially overmolded with the plastic of the electrical connection unit for fixing to the electrical connection unit.

10. An electric motor, comprising:
   an electric power supply device, the electric power supply device including:
     a housing that at least partially surrounds a housing interior and the housing has a housing opening, the housing comprising a pot-shaped structure including a pot base and a pot collar projecting at an angle from the pot base;

an electrical connection unit arranged in the housing interior that includes a busbar arrangement with at least three electrically conductive busbars for an electrical power supply;

wherein the electrical connection unit further includes an electrically insulating plug via which the at least three electrical busbars are electrically led out of the housing interior, the electrically insulating plug arranged at least partially in a lead-through opening, the lead-through opening defined in the pot collar, the electrically insulating plug has a plug housing, wherein respective end portions of the at least three electrical busbars are arranged in the plug housing, the electrically insulating plug merging into a flange section structured and arranged to fix the electrical connection unit on the pot base of the housing;

wherein the at least three busbars are arranged between the pot base and the flange section when the flange section is fastened to the pot base;

wherein the flange section is structured as a flat flange plate that covers the at least three bus bars, thereby providing a flat and mechanically stable fastening of the electrical connection unit to the pot base;

a stator and a rotor that is rotatable relative to the stator, and a motor housing, wherein the stator includes at least one stator coil that can be electrically energized via the electric power supply device, is arranged for driving the rotor.

11. The electric motor according to claim 10, wherein the electric power supply device is arranged on an outside of the motor housing.

12. The electric motor according to claim 10, wherein the housing of the electric power supply device rests against the motor housing.

13. The electric motor according to claim 10, wherein the busbar arrangement and the electrically insulating plug are fixedly connected to one another so that they form a structural unit.

14. The electric motor according to claim 10, wherein the plug housing defines a plug interior in which the respective end sections of the at least three busbars are arranged.

15. The electric motor according to claim 10, wherein the flange section is releasably fastened to the pot base.

16. The electric motor according to claim 10, wherein the flange plate is provided with at least one through-opening for receiving a screw element.

17. The electric motor according to claim 16, wherein the at least three busbars are arranged sandwiched between opposing sides of the pot base and the flange plate when the flange section is fastened to the pot base.

18. The electric motor according to claim 10, wherein the plug housing is positively connected to the pot collar and closes the lead-through opening provided on the pot collar.

19. The electric motor according to claim 10, wherein a material of the at least three busbars is a metal, and a material of the electrical connection unit is a plastic.

20. The electric motor according to claim 19, wherein the at least three busbars are at least partially overmolded with the plastic of the electrical connection unit for fixing the at least three busbars to the electrical connection unit.

* * * * *